United States Patent [19]

Tückmantel

[11] 4,109,923
[45] Aug. 29, 1978

[54] PIPE JOINT

[75] Inventor: Hans-Joachim Tückmantel, Mülheim (Ruhr), Fed. Rep. of Germany

[73] Assignee: Kempchen & Co. GmbH, Oberhausen, Fed. Rep. of Germany

[21] Appl. No.: 787,209

[22] Filed: Apr. 13, 1977

[30] Foreign Application Priority Data

Apr. 14, 1976 [DE] Fed. Rep. of Germany ....... 2616512

[51] Int. Cl.² .............................................. F16J 15/10
[52] U.S. Cl. ................................................... 277/101
[58] Field of Search ........................ 277/180, 166, 211

[56] References Cited

U.S. PATENT DOCUMENTS 2,513,178   6/1950   Jackson ................................. 277/180

FOREIGN PATENT DOCUMENTS 565,642  12/1932  Fed. Rep. of Germany ........... 277/180

*Primary Examiner*—Robert I. Smith
*Attorney, Agent, or Firm*—Karl F. Ross

[57] ABSTRACT

A joint between two pipe flanges comprises a substantially flat annular spacer with slightly beveled faces confronting respective flange surfaces, each of these faces having an annular groove occupied by a sealing ring of relatively soft metal projecting therefrom. Prior to assembly, each sealing ring has a ridge of preferably pointed cross-section protruding toward the confronting flange face against which that ridge is flattened upon a tightening of the assembly.

9 Claims, 2 Drawing Figures

PIPE JOINT

FIELD OF THE INVENTION

My present invention relates to a joint between two coaxial conduits provided with parallel confronting surfaces transverse to the conduit axis, designed to prevent the escape of a conveyed fluid.

BACKGROUND OF THE INVENTION

It is known, e.g. from U.S. Pat. No. 3,158,380, to interpose a metallic annular spacer between two flange surfaces and to insert an elastic sealing ring in an annular groove on each face of that spacer, the body of the spacer being split along its inner periphery by a radially extending annular channel into a pair of resilient lips respectively carrying these sealing rings. The pressure of the fluid entering the channel urges the sealing rings into contact with the adjoining flange surfaces. The sealing rings, consisting of rubber or the like, initially have a corrugated profile which is flattened against the spacer faces under pressure of clamping bolts that hold the two flanges together and traverse the spacer in a marginal zone lying radially outwardly of the sealing rings.

A joint of this description, employing elastomeric sealing rings, can be used only at relatively low temperatures. With conduits carrying hot fluids it would be necessary to make the rings of relatively soft metal, e.g. silver, copper or lead, if the flanges and the spacer consist of steel as is usually the case. Even then, however, proper functioning is not assured since even high clamping pressures will not necessarily distribute the material of the deformed sealing rings with sufficient uniformity within their annular grooves to prevent leakages. It has therefore been the practice in such instances to interpose a spacer with a sawtooth profile between the flanges and to separate that spacer from the flange surfaces by annular washers of relatively soft metal into which the sawteeth bite under pressure. Such a joint generally requires very high clamping pressures while still not guaranteeing fluidtightness in all instances.

OBJECTS OF THE INVENTION

The general object of my present invention, accordingly, is to provide an improved joint for the purpose described which insures satisfactory and reproducible results, even with relatively low clamping pressures.

A related object is to provide a joint of this description capable of maintaining its fluidtightness for prolonged periods while sustaining elevated temperatures and/or high pressures.

SUMMARY OF THE INVENTION

In accordance with my present invention, a solid annular spacer centered on the conduit axis has two substantially flat faces respectively adjoining a pair of confronting flange surfaces, each face being provided with an annular groove open toward the corresponding flange. A deformable sealing ring in each groove projects toward the adjoining flange surfaces and has a flattenable ridge which protrudes from the groove and contacts the flange surface in an initial stage of assembly, i.e. prior to the exertion of clamping pressure, along a zone which is substantially narrower than the groove. The two flanges are held together by fastening means disposed radially outwardly of the spacer, the faces of the spacer converging from their annular grooves outwardly at a small angle facilitating a flattening of the sealing-ring ridges upon a clamping of the flanges by the fastening means.

When the flanges and the spacer are made of a hard metal such as steel, which of course should be sufficiently heat-resistant to withstand the temperatures occurring in use, the deformable sealing rings should consist of a relatively deformable metal or alloy such as soft nickel, silver, copper or lead. The spacer and the sealing rings are thus distinguishable by their dissimilar materials consistent with their respective functions.

I have found, pursuant to a further feature of my invention, that best results are achieved when each sealing ring has an initial axial height exceeding the depth of the respective groove by substantially 20%, or one-fifth, of that depth; it is also desirable to make the initial volume of the sealing ring greater than that of the groove by approximately 1 – 5%, preferably about 3%.

BRIEF DESCRIPTION OF THE DRAWING

The above and other features of my invention will now be described in detail with reference to the accompanying drawing in which.

SPECIFIC DESCRIPTION

Figure 1:
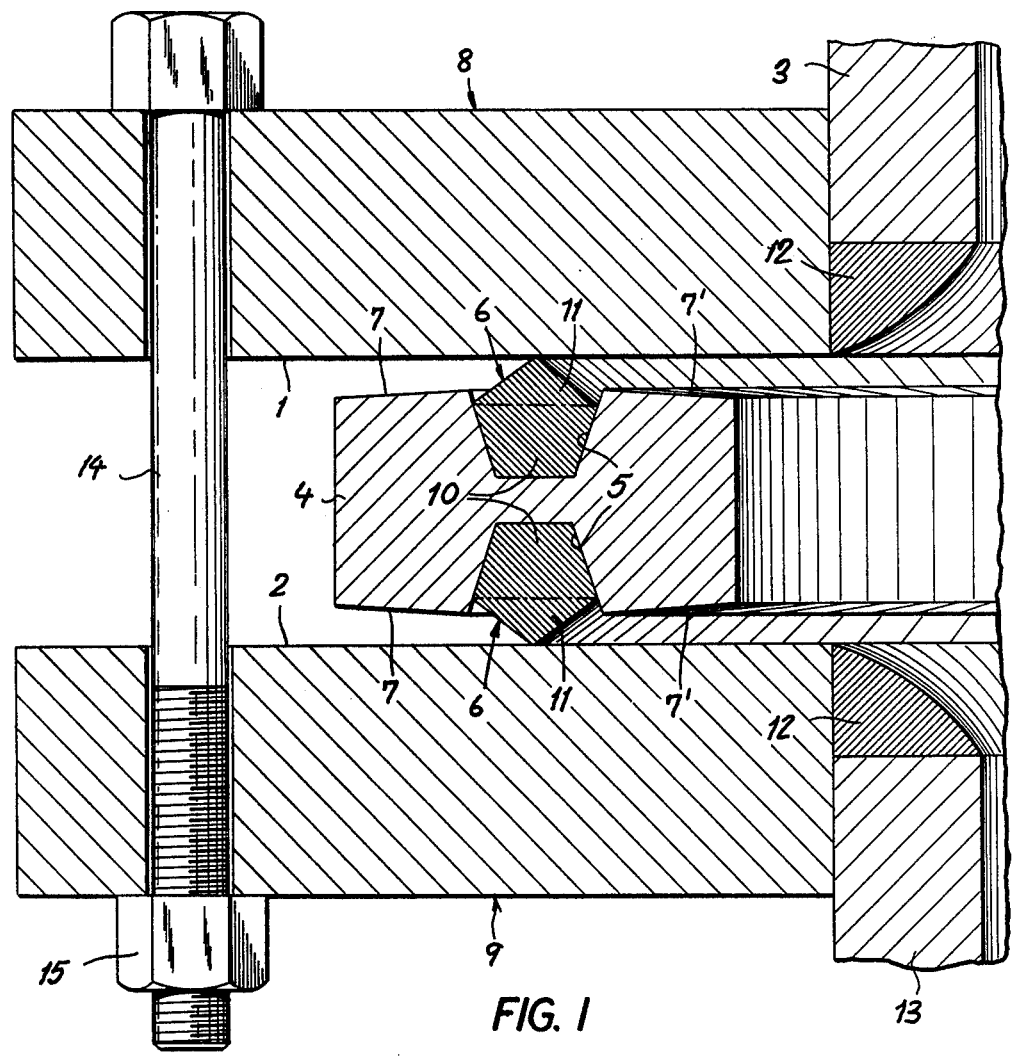
FIG. 1 is an axial sectional view of part of a pair of conduits provided with my improved joint, shown in an initial stage of assembly.

In the drawing I have shown a pair of coaxial pipes 3, 13 provided with respective annular flanges 8 and 9 which may be integral therewith or, as shown, welded to the pipes at 12. The flanges 8 and 9 have confronting surfaces 1 and 2 adjoining respective faces of an annular spacer 4, each of these faces being provided with an annular groove 5 diverging in cross-section toward the respective flange surface 1 or 2. The flanges are held together by a peripheral array of bolts 14 (only one shown) engaged by nuts 15, these bolts lying radially outwardly of spacer 4.

Each face of the spacer 4 has an annular land 7, lying between its groove 5 and its outer periphery, and another such land 7' lying between that groove and the inner periphery of the spacer. At least the outer lands 7 are slightly beveled to converge toward each other at a small angle (exaggerated in the drawing) of not more than a few degrees. In the embodiment illustrated, however, lands 7' are similarly beveled.

Figure 2:
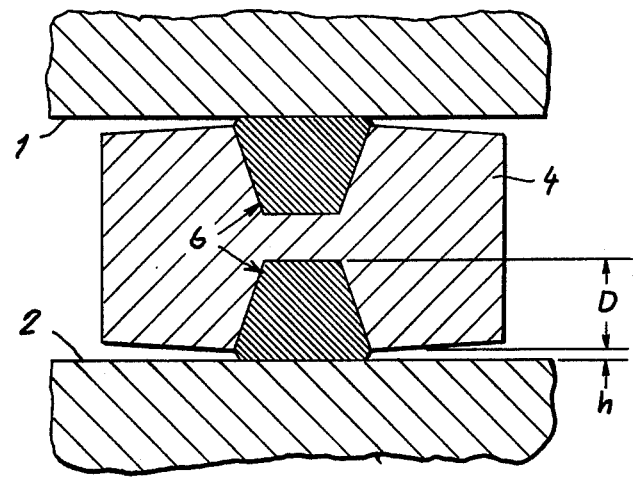
FIG. 2 shows a portion of the joint of FIG. 1 after exertion of clamping pressure.

Each groove 5 is occupied by a metallic sealing ring 6, having a cross-section in the form of a regular pentagon, which may be considered as composed of a base 10 of trapezoidal profile and a gable-shaped ridge 11. In the initial position of FIG. 1 the ridge 11 contacts the flange surface 1 or 2 along a very narrow annular zone while protruding from the corresponding face 7, 7' by about one-fifth of the depth D of its groove 5 (see FIG. 2). p The ridge 11 is partly recessed within groove 5, leaving clearances in that groove whose combined volume is less than that of the projecting ridge portion flanked thereby. Thus, upon the flattening of the ridge under the clamping pressure of fasteners 14, 15 as illustrated in FIG. 2, the deformed sealing rings 6 do not fully recede into their grooves 5 but protrude therefrom sufficiently to prevent the flanges 8 and 9 from coming to rest directly on the faces of spacer 4. As a result, the sealing rings adapt themselves over their entire circumference to the shape of the flange surfaces 1 and 2, thereby establishing a fluidtight all-around joint.

The height h of the protruding ring portion, exaggerated in FIG. 2, may be roughly 3% of the groove depth D; this conforms to the aforedescribed difference of a few percentage points between the ring volume and the groove volume.

The outwardly divergent shape of the groove profile simplifies the task of extracting the sealing rings 6 whenever it is necessary to replace them.

I claim:

1. In a joint between two coaxial conduits having peripheral flanges with parallel confronting surfaces transverse to the conduit axis, the combination therewith of:
- a solid annular spacer centered on said axis and inserted between said flanges, said spacer having two substantially flat faces respectively adjoining said surfaces and being provided on each of said faces with an annular groove of outwardly diverging cross-section open toward the adjoining flange surface;
- a deformable sealing ring in each groove projecting toward the adjoining flange surface, each sealing ring having a cross-section substantially in the shape of a regular pentagon which forms a flattenable gable-shaped ridge protruding from the respective groove and contacting the corresponding flange surface in an initial stage of assembly along a zone substantially narrower than said groove; and
- fastening means engaging said flanges radially outwardly of said spacer for axially clamping said flanges together against said spacer with resulting flattening of said ridge of each sealing ring, the faces of said spacer converging from their annular grooves outwardly at a small angle facilitating such flattening.

2. The combination defined in claim 1 wherein said ridge is partly recessed within said groove in said initial stage.

3. The combination defined in claim 2 wherein the recessed part of said ridge is flanked by clearances in said groove whose combined volume is less than the volume of the protruding part of said ridge whereby the latter, upon being flattened, rises beyond the corresponding face of said spacer.

4. In a joint between two coaxial conduits having peripheral flanges with parallel confronting surfaces transverse to the conduit axis, the combination therewith of:
- a solid annular spacer centered on said axis and inserted between said flanges, said spacer having two substantially flat faces respectively adjoining said surfaces and being provided on each of said faces with an annular groove of outwardly diverging cross-section open toward the adjoining flange surface;
- a deformable metallic sealing ring in each groove projecting toward the adjoining flange surface, each sealing ring having a flattenable gable-shaped ridge partly recessed in the respective groove and protruding therefrom into contact with the corresponding flange surface in an initial stage of assembly along a zone substantially narrower than said groove, the recessed part of said ridge being flanked by clearances in said groove whose combined volume is less than the volume of the protruding part of said ridge whereby the latter, upon being flattened, rises beyond the corresponding face of said spacer; and
- fastening means engaging said flanges radially outwardly of said spacer for axially clamping said flanges together against said spacer with resulting flattening of said ridge of each sealing ring, the faces of said spacer converging from their annular grooves outwardly at a small angle facilitating such flattening.

5. The combination defined in claim 1 wherein each sealing ring has an initial axial height exceeding the depth of the respective groove by substantially one-fifth.

6. The combination defined in claim 3 wherein each sealing ring has an initial volume exceeding the volume of the respective groove by substantially 1–5%.

7. The combination defined in claim 4 wherein each sealing ring has a cross-section substantially in the shape of a regular pentagon.

8. The combination defined in claim 4 wherein said faces also converge from their annular grooves inwardly.

9. The combination defined in claim 4 wherein said flange and said spacer consist of steel, said sealing rings consisting of a metal softer than steel.

* * * * *